US011280388B1

(12) United States Patent
Girard et al.

(10) Patent No.: US 11,280,388 B1
(45) Date of Patent: Mar. 22, 2022

(54) MULTIPLE DRIVE VARIABLE TRANSMISSION RATIO SYSTEM WITH SELECTIVE ACTUATOR ENGAGEMENT

(71) Applicants: Alexandre Girard, Sherbrooke (CA); Haruhiko Harry Asada, Lincoln, MA (US)

(72) Inventors: Alexandre Girard, Sherbrooke (CA); Haruhiko Harry Asada, Lincoln, MA (US)

(73) Assignee: Empower Robotics Corporation, Lexington, MA (US)

( * ) Notice: Subject to any disclaimer, the term of this patent is extended or adjusted under 35 U.S.C. 154(b) by 669 days.

(21) Appl. No.: 16/033,436

(22) Filed: Jul. 12, 2018

Related U.S. Application Data

(60) Provisional application No. 62/533,486, filed on Jul. 17, 2017.

(51) Int. Cl.
*F16H 3/46* (2006.01)
*F16H 61/688* (2006.01)
(Continued)

(52) U.S. Cl.
CPC ............. *F16H 3/46* (2013.01); *F16D 65/028* (2013.01); *F16H 57/10* (2013.01); *F16H 61/22* (2013.01);
(Continued)

(58) Field of Classification Search
CPC ............. F16D 65/028; F16D 2065/022; F16D 2041/0606
See application file for complete search history.

(56) References Cited

U.S. PATENT DOCUMENTS 4,658,940 A * 4/1987 Ulmann .................. F16D 41/08
188/161
5,211,610 A * 5/1993 Hurth ...................... F16H 47/04
475/1
(Continued)

FOREIGN PATENT DOCUMENTS

JP 08298748 A * 11/1996 ............. F16H 3/727

OTHER PUBLICATIONS

JP08298748 translation (Year: 1996).*
(Continued)

*Primary Examiner* — Timothy Hannon
(74) *Attorney, Agent, or Firm* — Spano Law Group; Joseph S. Spano

(57) ABSTRACT

Methods and systems for seamlessly transitioning a load between two different actuators each having a different transmission ratio are described herein. A multiple drive, variable transmission ratio (MD-VTR) system includes two drive actuators, each having different reduction ratios, a locking mechanism, and a differential transmission subsystem. In one aspect, a MD-VTR system includes a locking mechanism disposed between a drive actuator and an input port of the differential. The locking mechanism couples the input port of the differential to a stationary reference frame element in a locked state. In an unlocked state, the locking mechanism couples the drive actuator to the input port of the differential. In some embodiments, the locking mechanism includes an actuator to actively transition between the locked and unlocked states. In some other embodiments, the locking mechanism transitions between the locked and unlocked states based on torque applied by the drive actuator.

14 Claims, 11 Drawing Sheets

(51) Int. Cl.
*F16H 61/22* (2006.01)
*F16D 65/02* (2006.01)
*F16H 57/10* (2006.01)
*H02K 7/116* (2006.01)

(52) U.S. Cl.
CPC ..... *F16H 61/688* (2013.01); *F16D 2065/022* (2013.01); *H02K 7/116* (2013.01)

(56) References Cited

U.S. PATENT DOCUMENTS

| | | | | |
|---|---|---|---|---|
| 6,206,164 | B1* | 3/2001 | Kurita | F16D 41/10 |
| | | | | 192/223.2 |
| 9,976,639 | B2* | 5/2018 | Yasui | F16H 1/46 |
| 2006/0278487 | A1* | 12/2006 | Pawley | F16D 41/125 |
| | | | | 192/43.1 |
| 2010/0285913 | A1* | 11/2010 | Burjes | B60K 17/346 |
| | | | | 475/72 |
| 2011/0067961 | A1* | 3/2011 | Duits | F16D 63/006 |
| | | | | 188/82.84 |
| 2011/0127134 | A1* | 6/2011 | Iwano | F16D 41/105 |
| | | | | 192/45.008 |
| 2011/0259673 | A1* | 10/2011 | Hayase | B66F 3/08 |
| | | | | 187/233 |
| 2013/0157808 | A1* | 6/2013 | Treichel | B60K 6/365 |
| | | | | 477/15 |
| 2015/0300472 | A1* | 10/2015 | Park | B62M 6/55 |
| | | | | 475/8 |
| 2017/0343082 | A1* | 11/2017 | Hehenberger | H02P 3/20 |
| 2018/0266501 | A1* | 9/2018 | Novin | F16D 41/067 |

OTHER PUBLICATIONS

Girard, Alexandre, "Fast and strong lightweight robots based on variable gear ratio actuators and control algorithms leveraging the natural dynamics," http://hdl.handle.net/1721.1/111689.

Girard, Alexandre et al., "A Two-Speed Actuator For Robotics with Fast Seamless Gear Shifting," 2015 IEEE/RSJ International Conference on Intelligent Robots and Systems (IROS), Congress Center Hamburg, Sep. 28-Oct. 2, 2015, Hamburg, Germany.

Kim, B.-S. et al., "A serial-type dual actuator unit with planetary gear train: Basic design and applications," IEEE/ASME Transactions on Mechatronics, vol. 15, No. 1, pp. 108-116, 2010.

Lee, H. and Choi, Y., "A new actuator system using dual-motors and a planetary gear," IEEE/ASME Transactions on Mechatronics, vol. 17, No. 1, pp. 192-197, 2012.

* cited by examiner

200

| SELECTIVELY DISENGAGE A FIRST DRIVE ACTUATOR OF A MULTIPLE DRIVE VARIABLE TRANSMISSION RATIO SYSTEM FROM A LOAD COUPLED TO A FIRST INPUT PORT OF A DIFFERENTIAL TRANSMISSION SUBSYSTEM BY LOCKING THE LOAD TO A REFERENCE STRUCTURAL ELEMENT BY MOVING A PLURALITY OF ENGAGING ELEMENTS OF A LOCKING MECHANISM TO AN ENGAGED POSITION THAT COUPLES THE LOAD TO THE REFERENCE STRUCTURAL ELEMENT | ~201 |

↓

| SELECTIVELY ENGAGE THE FIRST DRIVE ACTUATOR OF THE MULTIPLE DRIVE VARIABLE TRANSMISSION RATIO SYSTEM TO THE LOAD BY UNLOCKING THE LOAD FROM THE REFERENCE STRUCTURAL ELEMENT BY MOVING THE PLURALITY OF ENGAGING ELEMENTS OF THE LOCKING MECHANISM TO A DISENGAGED POSITION THAT DECOUPLES THE LOAD FROM THE REFERENCE STRUCTURAL ELEMENT | ~202 |

FIG. 20

MULTIPLE DRIVE VARIABLE TRANSMISSION RATIO SYSTEM WITH SELECTIVE ACTUATOR ENGAGEMENT

CROSS REFERENCE TO RELATED APPLICATIONS

The present application for patent claims priority under 35 U.S.C. § 119 from U.S. provisional patent application Ser. No. 62/533,486, entitled "Multiple Drive Variable Transmission Ratio System With Selective Actuator Engagement," filed Jul. 17, 2017, the subject matter of which is incorporated herein by reference in its entirety.

TECHNICAL FIELD

The described embodiments relate to systems and methods for transmitting torque with variable transmission ratio to achieve a wide range of torque and speed in a compact envelope.

BACKGROUND INFORMATION

In many applications, rotary drive motors (e.g., electric motors) are often employed in combination with large reduction ratio transmissions to generate the required torque. However, large reduction ratio transmissions limit output speed. In some examples, this limitation is avoided by employing a larger, higher torque motor with a smaller reduction ratio. Unfortunately, this results in a drive system that is large and heavy, and generally operates with low efficiency over a wide range of operating speeds. In some other examples, variable reduction ratio transmissions are employed to widen the range of achievable output speeds. However, most modern variable transmission ratio systems suffer from a number of practical disadvantages including, torque interruption during change of gear ratio, limited range of continuously varying gear ratio, and mechanical complexity. This limits implementation of existing variable reduction ratio transmissions in applications that require both seamless, uninterrupted transition of reduction ratio and a large range of reduction ratio.

In summary, improvements in the design of systems to vary mechanical transmission ratio are desired. More specifically, variable transmission ratio systems with seamless transition of transmission ratio over a wide range of speeds, low complexity, and compact size are desired.

SUMMARY

Methods and systems for seamlessly transitioning a load between two different actuators each having a different transmission ratio are described herein. A seamless transition between a high torque, low speed actuator and a low torque, high speed actuator enables a drive system with a wide range of torque and operating speed in a small, lightweight package.

A multiple drive, variable transmission ratio (MD-VTR) system includes two drive actuators, each having different reduction ratios, a locking mechanism, and a differential transmission subsystem. In one aspect, a MD-VTR system includes a locking mechanism disposed between a drive actuator and an input port of the differential. The locking mechanism selectively couples the drive actuator to the input port, and hence the output load. In this manner, the locking mechanism selectively engages the drive actuator to the load and disengages the drive actuator from the load. In a locked state, the locking mechanism effectively couples the corresponding input port of the differential to a reference frame element (e.g., a structural element with respect to which the load is moving). In the locked state, the corresponding drive actuator is effectively disengaged from the input port and hence the output load (i.e., the drive actuator does not transmit substantial force or torque to the output load and the output load is not substantially reflected back to the drive actuator). In an unlocked state, the locking mechanism effectively couples drive actuator to the corresponding input port of the differential, and hence the output load.

In a further aspect, the locking mechanism employs an actuator to actively transition between the locked and unlocked states.

In another further aspect, the locking mechanism transitions between the locked and unlocked states based on torque applied by the drive actuator.

The foregoing is a summary and thus contains, by necessity, simplifications, generalizations, and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

BRIEF DESCRIPTION OF THE DRAWINGS

FIG. 20 depicts a flowchart 200 illustrative of a method of operating a MD-VTR system as described herein.

DETAILED DESCRIPTION

Reference will now be made in detail to background examples and some embodiments of the invention, examples of which are illustrated in the accompanying drawings.

Methods and systems for seamlessly transitioning a load between two different actuators each having a different transmission ratio are described herein. A seamless transition between a high torque, low speed actuator and a low torque, high speed actuator enables a drive system with a wide range of torque and operating speed in a small, lightweight package.

A multiple drive, variable transmission ratio (MD-VTR) system includes two drive actuators, each having different reduction ratios, a locking mechanism, and a differential transmission subsystem. In one aspect, a MD-VTR system includes a locking mechanism disposed between a drive actuator and an input port of the differential. The locking mechanism selectively couples the drive actuator to the input port, and hence the output load. In this manner, the locking mechanism selectively engages the drive actuator to the load and disengages the drive actuator from the load. In a locked state, the locking mechanism effectively couples the corresponding input port of the differential to a reference frame element (e.g., a structural element with respect to which the load is moving). In the locked state, the corresponding drive actuator is effectively disengaged from the input port and hence the output load (i.e., the drive actuator does not transmit substantial force or torque to the output load and the output load is not substantially reflected back to the drive actuator). In an unlocked state, the locking mechanism effectively couples drive actuator to the corresponding input port of the differential, and hence the output load.

Figure 1:
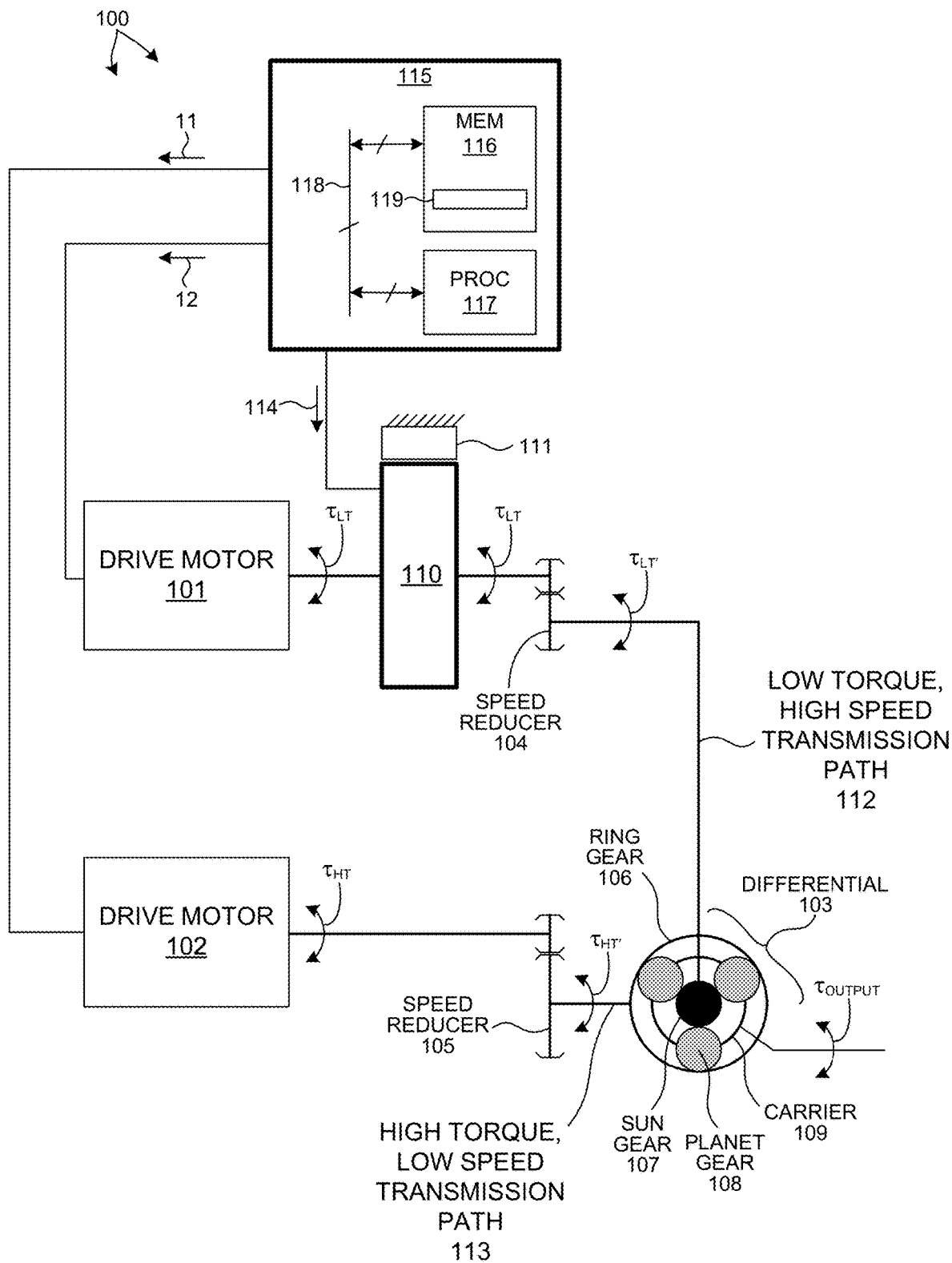
FIG. 1 is a diagram illustrative of a multiple drive, variable transmission ratio (MD-VTR) system in one embodiment.

FIG. 1 depicts a multiple drive, variable transmission ratio (MD-VTR) system in one embodiment. As depicted in FIG. 1, a MD-VTR system includes drive motor 101, drive motor 102, a differential transmission subsystem 103, and locking mechanism 110. FIG. 1 also illustrates an embodiment employing speed reduction (e.g., gear reduction) between each drive actuator and differential 103. The embodiment depicted in FIG. 1 includes speed reducers 104 and 105. As depicted in FIG. 1, the output of drive motor 102, $\tau_{HT}$, is transmitted to speed reducer 105 and up-converted to a higher torque, $\tau_{HT'}$ and down-converted to a lower speed by a speed reduction ratio. Similarly, the output of drive motor 101, $\tau_{LT}$, is transmitted to speed reducer 104 and up-converted to a higher torque, $\tau_{LT'}$ and down-converted to a lower speed by another speed reduction ratio. The outputs of speed reducers 104 and 105 are coupled to the two inputs of differential transmission subsystem 103. The transmission path 112 from drive motor 101 to differential 103 is a low torque, high speed transmission path. The transmission path 113 from drive motor 102 to differential 103 is a high torque, low speed transmission path. In other words, the combination of drive motor 101 and speed reducer 104 is capable of lower torque and higher speed operation compared to the combination of drive motor 102 and speed reducer 105, and vice-versa.

In general, speed reducers 104 and 105 may be any suitable speed reduction ratio. Moreover, speed reducer 104, speed reducer 105, or both, are optional. In a preferred embodiment, the speed reduction ratio of speed reducer 105 is larger than speed reducer 104. This enables higher torque and lower speed capability of transmission path 113 compared to transmission path 112, and vice-versa. This may be desirable when low backdriveability (i.e., self-locking capability) of the MD-VTR system through the high-torque, low speed transmission path is desired. In some embodiments, speed reducer 104 does not exist, or has a very small reduction ratio. This may be desirable to enable high backdriveablity of the MD-VTR system through the low-torque, high speed transmission path.

As depicted in FIG. 1, differential subsystem 103 is configured as an epicyclic gear system including a sun gear 107, a number of planet gears 108 each attached to a carrier 109, and a ring gear 106. As depicted in FIG. 1, sun gear 107 is coupled to the output of the low torque, high speed transmission path 112, ring gear 106 is coupled to the output of high torque, low speed transmission path 113, and carrier 109 is coupled to the output of MD-VTR system 100. The epicyclic gear system combines the inputs, $\tau_{LT'}$ and $\tau_{HT'}$, and generates an output torque, $\tau_{OUTPUT}$. In general, the epicyclic gear system is a three port mechanical system: the ring gear, the carrier, and the sun gear. Any two ports may be configured as inputs and the third port is the output. Thus, in general, the low torque, high speed transmission path 112 and the high torque, low speed transmission path 113 may be coupled to any two ports of the epicyclic gear system, and the output may be coupled to the third port. In some embodiments, the sizing of the gearing of differential transmission subsystem 103 is configured to provide suitable speed reduction in combination with, or without the use of, speed reducer 104, speed reducer 105, or both. In some other embodiments, a speed reducer may be located along the output transmission path of differential 103.

As depicted in FIG. 1, locking mechanism 110 selectively locks the output of drive motor 101 to a reference structure 111 (e.g., a non-moving structural element). In the embodiment depicted in FIG. 1, computing system 115 communicates a command signal 114 to locking mechanism 110 that causes locking mechanism to lock the output of drive motor 101 to reference structure 111 or to unlock the output of drive motor 101 from reference structure 111.

In general, drive motors 101 and 102 may be electric motors, pneumatic motors, hydraulic motors, or any other suitable transducer. In addition, the gear reduction associated with each drive motor may be realized by any suitable mechanism (e.g., mechanical gearing, belt and pulley arrangement, etc.). Furthermore, the reduction may be realized between the drive actuator and the differential (as depicted in FIG. 1), within the differential, or between the differential and the output load.

In a further aspect, the locking mechanism employs an actuator to actively transition between the locked and unlocked states.

Figure 2:
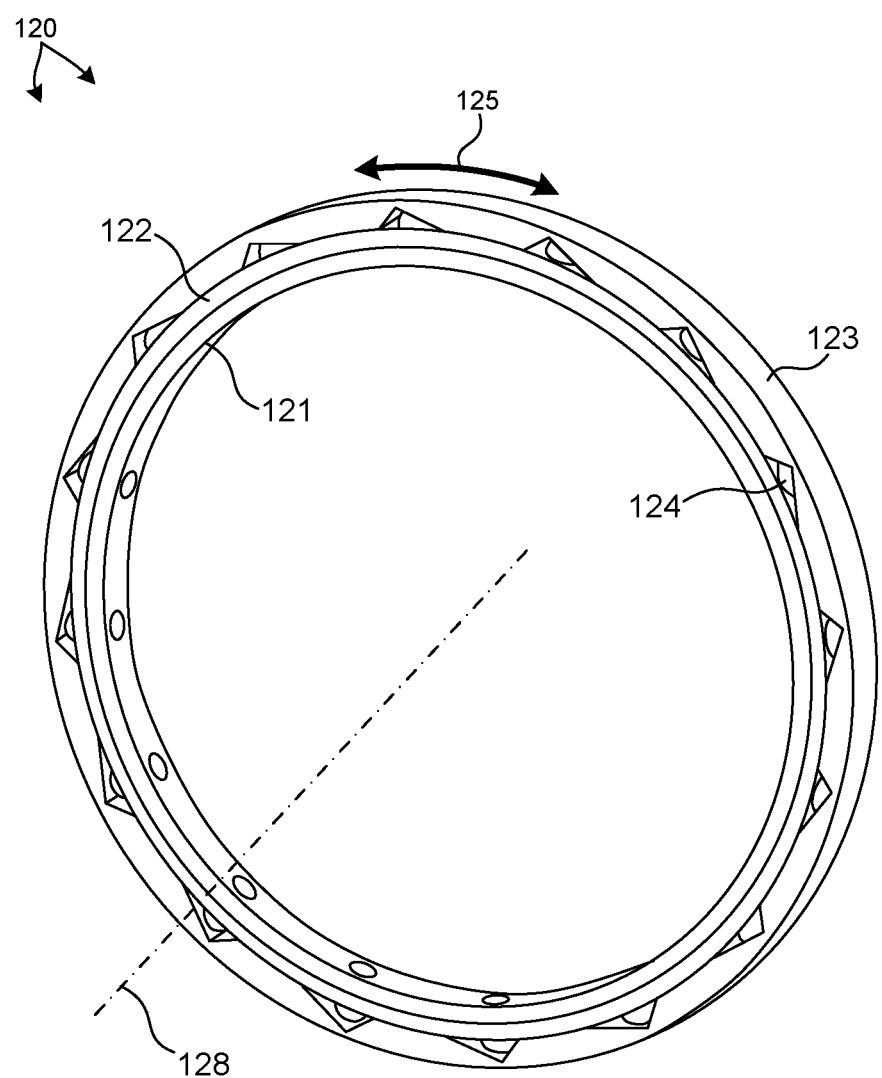
FIG. 2 is a diagram illustrative of a locking mechanism in one embodiment 120.

FIG. 2 depicts a locking mechanism in one embodiment 120. Locking mechanism 120 includes frame 121 coupled to the input of the locking mechanism (e.g., coupled to the output of a drive motor), a reference structure 122 coupled to mechanical ground (i.e., not moving with respect to the MD-VTR system), and a sliding frame 123 actively rotated by actuator 125. A set of engaging elements 124 (e.g., spheres) are captured in voids of reference structure 122. Depending on a position of sliding frame 123, the sliding frame 123 either guides the engaging elements into receiving cavities in frame 121 and locks frame 121 to reference structure 122, or allows the set of engaging elements to move away from the receiving cavities and releases frame 121 from reference structure 122.

Figure 3:
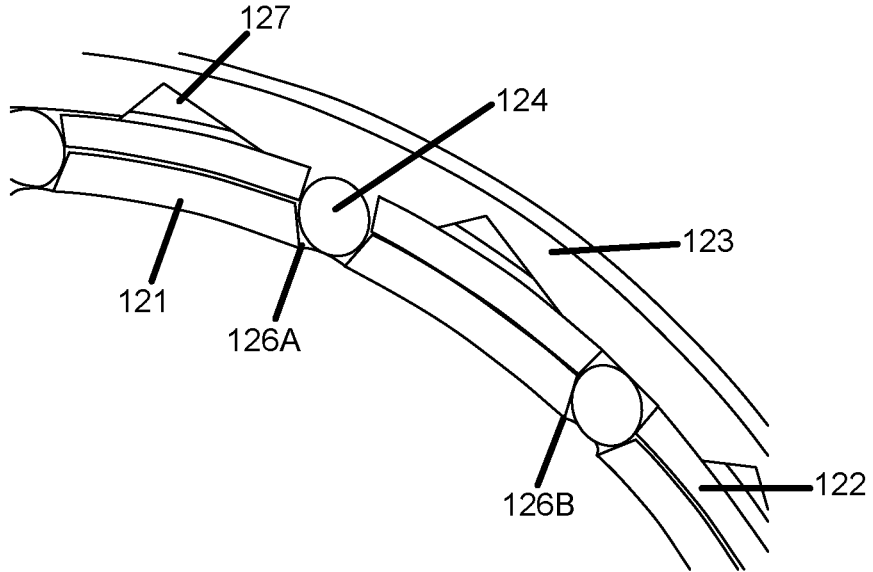
FIG. 3 is a diagram illustrative of a locking mechanism 120 in a locked state.
Figure 4:
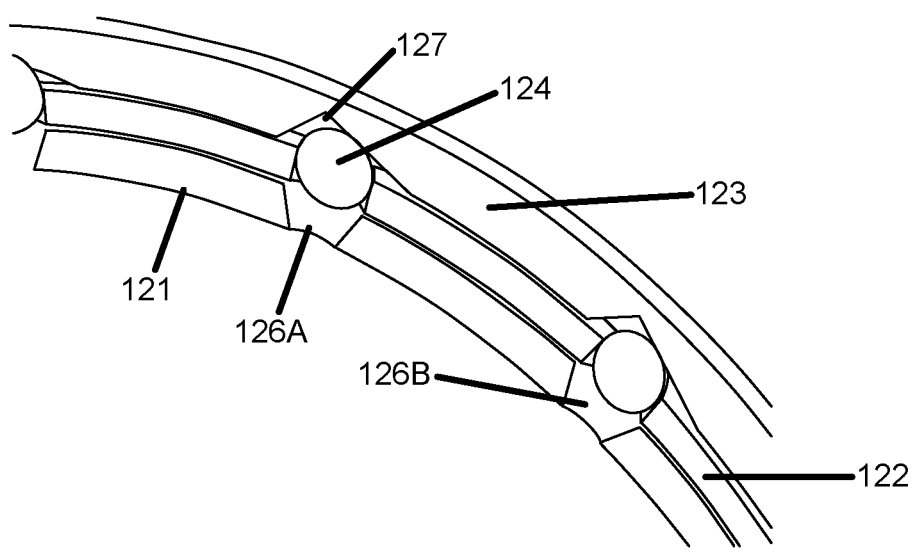
FIG. 4 is a diagram illustrative of a locking mechanism 120 in an unlocked state.

FIGS. 3 and 4 depict locking mechanism 120 in a locked and unlocked state, respectively. As depicted in FIG. 3, sliding frame 123 includes an inner radius profile having voids 127. As depicted in FIG. 4, when the voids 127 of sliding frame 123 are aligned with the set of engaging elements 124, the engaging elements 124 move away from receiving cavities 126A-B and release frame 121 from reference structure 122. As depicted in FIG. 3, when the voids of sliding frame 123 are not aligned with the set of engaging elements 124, the engaging elements 124 are forced into receiving cavities 126A-B and lock frame 121 to reference structure 122.

As depicted in FIGS. 3 and 4, engaging elements 124 move toward and away from receiving cavities 126A-B at one or more index positions of frame 121 with respect to reference structure 122. An index position is a position of frame 121 with respect to reference structure 122 where the receiving cavities 126A-B are aligned with the voids in reference structure 122 that capture engaging elements 124. Thus, an engaging movement of the sliding frame 123 causes the engaging elements 124 to move into contact with the receiving cavities 126A-B at an index position of the sliding frame element with respect to the reference structural element. In addition, a disengaging movement of the sliding frame 123 causes the plurality of engaging elements to move out of contact with the plurality of receiving cavities 126A-B. In general, the shape of the receiving cavities 126A-B is designed to disgorge the engaging elements 124 from the receiving cavities 126A-B when sliding frame 123 is moved to a disengagement position and a small amount of torque is applied to frame 121. Also, in some embodiments, the inner radius profile of sliding frame 123 is designed such that no holding force is required to maintain the engaged (locked) or disengaged (unlocked) position of the sliding frame with respect to reference structure 122.

Figure 5:
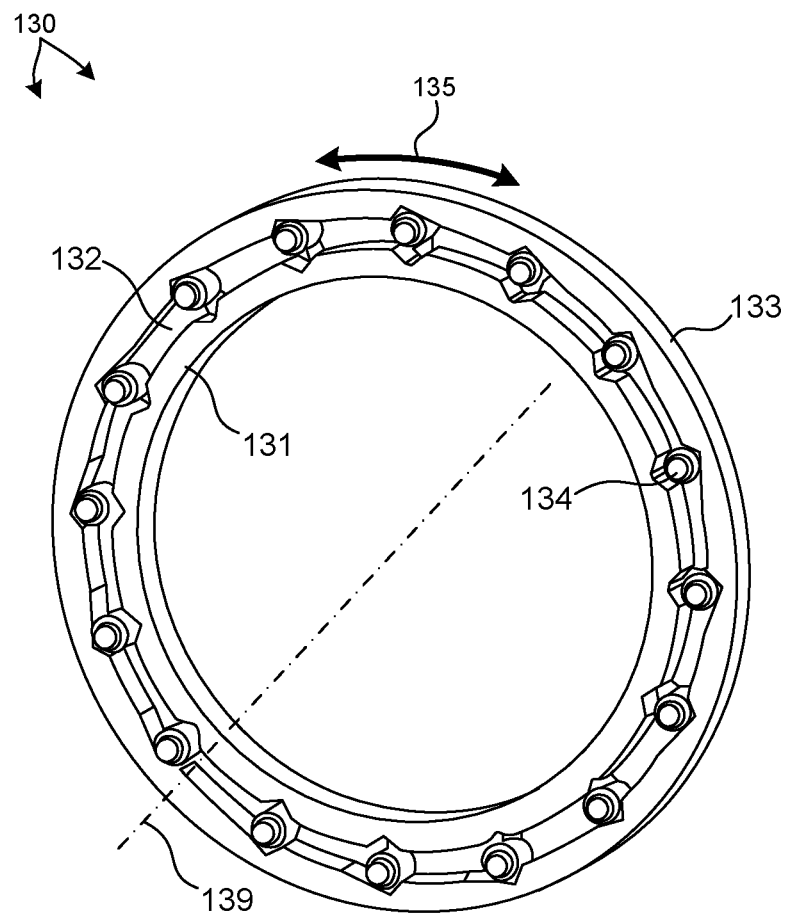
FIG. 5 is a diagram illustrative of a locking mechanism in another embodiment 130.

FIG. 5 depicts a locking mechanism in one embodiment 130. Locking mechanism 130 includes frame 131 coupled to the input of the locking mechanism (e.g., coupled to the output of a drive motor), a reference structure 132 coupled to mechanical ground (i.e., not moving with respect to the MD-VTR system), and a sliding frame 133 actively rotated by actuator 135. A set of engaging elements 134 (e.g., cylinders or rollers) are captured in voids 138 of reference structure 132. Depending on a position of sliding frame 133, the sliding frame 133 either guides the engaging elements into receiving cavities in frame 131 and locks frame 131 to reference structure 132, or allows the set of engaging elements to move away from the receiving cavities and releases frame 131 from reference structure 132.

Figure 6:
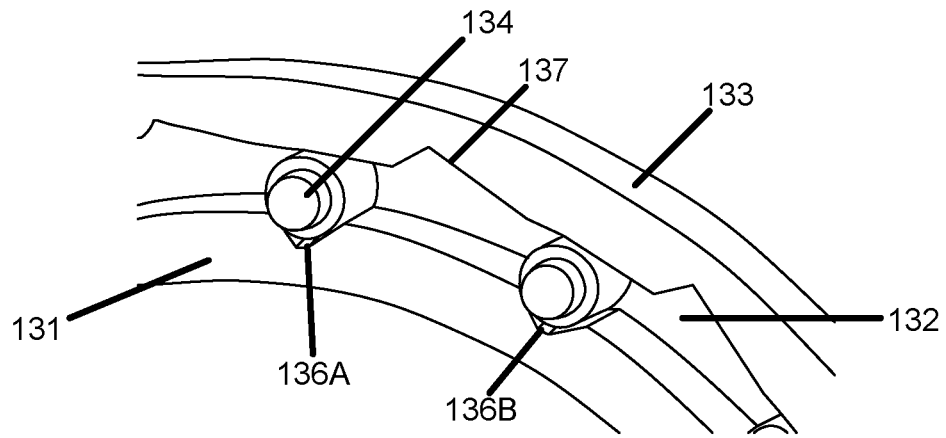
FIG. 6 is a diagram illustrative of a locking mechanism 130 in a locked state.
Figure 7:
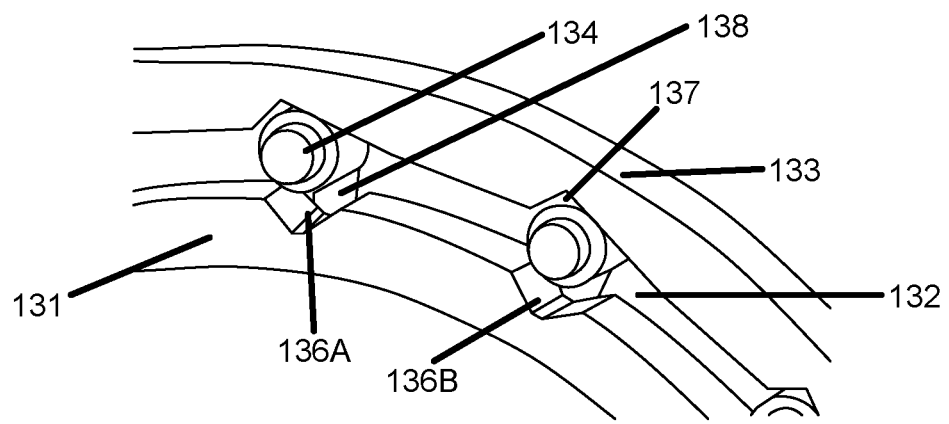
FIG. 7 is a diagram illustrative of a locking mechanism 130 in an unlocked state.

FIGS. 6 and 7 depict locking mechanism 130 in a locked and unlocked state, respectively. As depicted in FIG. 6, sliding frame 123 includes an inner radius profile having voids 137. As depicted in FIG. 7, when the voids 137 of sliding frame 133 are aligned with the set of engaging elements 134, the engaging elements 134 move away from receiving cavities 136A-B and release frame 131 from reference structure 132. As depicted in FIG. 6, when the voids of sliding frame 133 are not aligned with the set of engaging elements 134, the engaging elements 134 are forced into receiving cavities 136A-B and lock frame 131 to reference structure 132.

As depicted in FIGS. 6 and 7, engaging elements 134 move toward and away from receiving cavities 136A-B at one or more index positions of frame 131 with respect to reference structure 132. An index position is a position of frame 131 with respect to reference structure 132 where the receiving cavities 136A-B are aligned with the voids in reference structure 132 that capture engaging elements 134. Thus, an engaging movement of the sliding frame 133 causes the engaging elements 134 to move into contact with the receiving cavities 136A-B at an index position of the sliding frame element with respect to the reference structural element. In addition, a disengaging movement of the sliding frame 133 causes the plurality of engaging elements to move out of contact with the plurality of receiving cavities 136A-B. In general, the shape of the receiving cavities 136A-B is designed to disgorge the engaging elements 134 from the receiving cavities 136A-B when sliding frame 133 is moved to a disengagement position and a small amount of torque is applied to frame 131. Also, in some embodiments, the inner radius profile of sliding frame 133 is designed such that no holding force is required to maintain the engaged (locked) or disengaged (unlocked) position of the sliding frame with respect to reference structure 132.

The embodiments of locking devices depicted in FIGS. 2-7 required a radial movement of the engaging elements with respect to the locking device. In other words, the movement of the engaging elements from the engaged to disengaged positions, and vice-versa, is perpendicular to an axis of rotation of the locking device (e.g., axis of rotation 128 depicted in FIG. 2 and axis of rotation 139 depicted in FIG. 5). In some other embodiments, an axial movement of the engaging elements with respect to the locking device is employed. In these embodiments, the movement of the engaging elements from the engaged to disengaged positions, and vice-versa, is parallel to an axis of rotation of the locking device (e.g., parallel to axis of rotation 146 depicted in FIG. 8).

Figure 8:
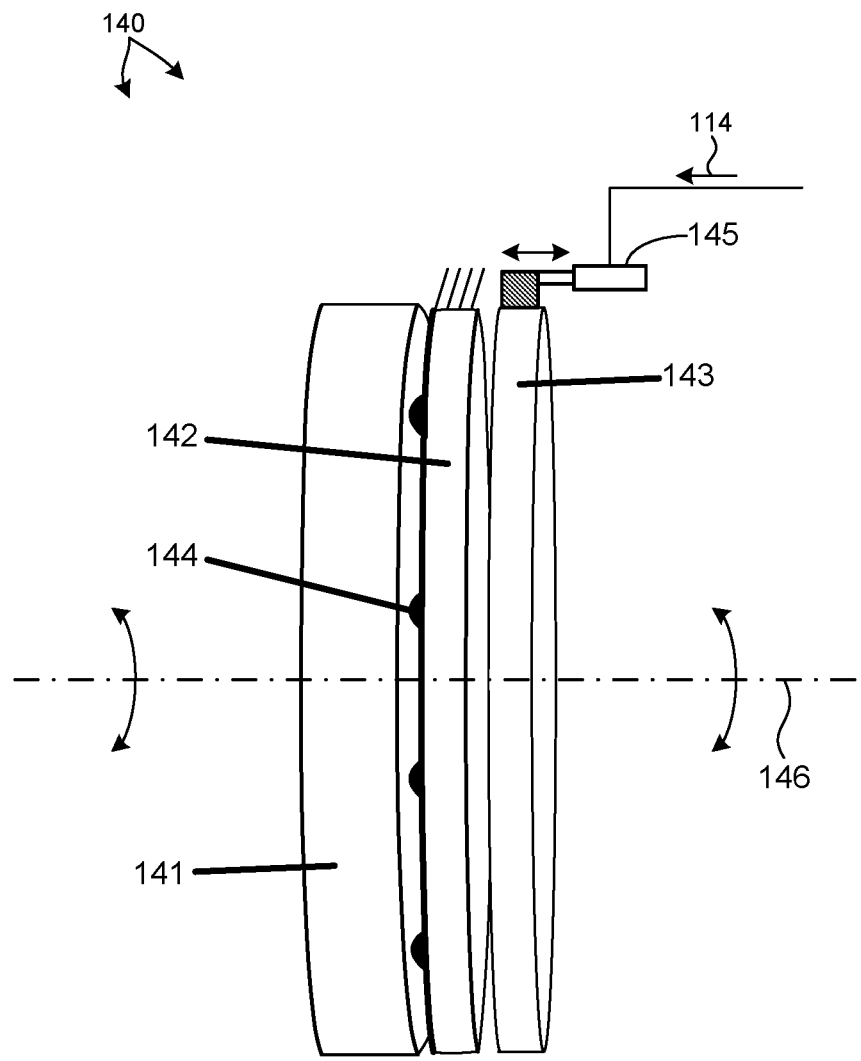
FIG. 8 is a diagram illustrative of a locking mechanism in one embodiment 140.

FIG. 8 depicts a locking mechanism in one embodiment 140. Locking mechanism 140 includes frame 141 coupled to the input of the locking mechanism (e.g., coupled to the output of a drive motor), a reference structure 142 coupled to mechanical ground (i.e., not moving with respect to the MD-VTR system), and a sliding frame 143 actively translated by actuator 145 in a direction parallel to axis of rotation 146. A set of engaging elements 144 (e.g., spheres, cylinders, etc.) are captured in voids of reference structure 142. Depending on a position of sliding frame 143, the sliding frame 143 either guides the engaging elements into receiving cavities in frame 141 and locks frame 141 to reference structure 142, or allows the set of engaging elements to move away from the receiving cavities and releases frame 141 from reference structure 142.

In the embodiments depicted in FIGS. 2-8, each of the receiving cavities are arranged equidistant from an axis of rotation of the locking mechanism. Moreover, each of the receiving cavities are arranged equidistant from an adjacent receiving cavity (i.e., the receiving cavities are equally spaced about a circumference of the locking mechanism. In this manner, the number of index positions for a 360 degree rotation of the locking mechanism is equal to the number of receiving cavities. In some other embodiments, receiving cavities may be arranged in any other suitable manner.

As depicted in FIG. 1, computing system 115 controls the transition between locked and unlocked states of the locking mechanism.

In one example, computing system 115 communicates a command signal to a locking mechanism that causes locking mechanism to transition to an unlocked state. In some examples, computing system 115 communicates command signal 114 to actuator 125 of locking mechanism 120 that causes actuator 125 to move sliding frame 125 with respect to reference structure 122 such that the voids 127 of sliding frame 123 are aligned with the set of engaging elements 124. In this configuration, the engaging elements 124 move away from receiving cavities 126A-B and release frame 121 from reference structure 122. At this point, the low torque, high speed drive motor is effectively coupled to the output load and is controlled (e.g., by computing system 115) to achieve a desired motion of the output load. Due to the relatively low speed capability of the high torque, low speed drive motor, the high torque, low speed drive motor is generally controlled (e.g., by computing system 115) to either maintain position or operate at a low speed while the low torque, high speed drive motor is controlled to achieve a desired motion of the output load.

In another example, computing system 115 communicates command signals to the drive motors and to a locking mechanism that causes the locking mechanism to transition to a locked state. In one example, computing system 115 communicates a command signal 11 to drive motor 101 that causes drive motor 101 to slow down and stop at an index position. At the same time, computing system 115 communicates a command signal 12 to drive motor 102 that causes drive motor 102 to speed up to compensate for the reduction in output speed caused by the slowing and stopping of drive motor 101. After drive motor 101 arrives at the index position, computing system 115 communicates a command signal 114 to actuator 125 of locking mechanism 120 that causes actuator 125 to move sliding frame 125 with respect to reference structure 122 such that the voids 127 of sliding frame 123 are moved away from the set of engaging elements 124. In this configuration, the engaging elements 124 are forced into receiving cavities 126A-B and lock frame 121 to reference structure 122. At this point, the low torque, high speed drive motor is effectively decoupled from the output load and the high torque, low speed drive motor 102 is controlled (e.g., by computing system 115) to achieve a desired motion of the output load.

The aforementioned control examples are described with reference to locking mechanism 120, for illustration purposes, and are applicable to all of the active locking mechanisms contemplated within the scope of this patent document.

In the embodiments described with reference to FIGS. 2-8, an actuator is required to transition between the locked and unlocked states. In another aspect, the locking mechanism transitions between the locked and unlocked states based on torque applied by the drive actuator.

Figure 9:
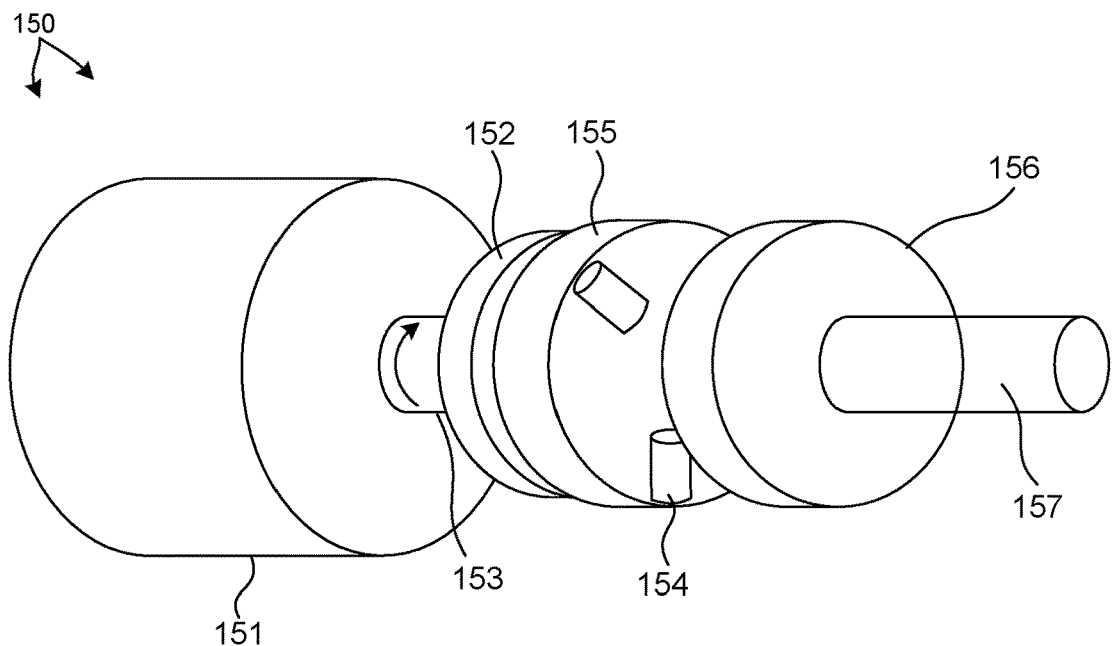
FIG. 9 is a diagram illustrative of an embodiment 150 of a locking mechanism that transitions between locked and unlocked states based on torque applied by a drive actuator.

FIG. 9 depicts an embodiment 150 of a locking mechanism that transitions between the locked and unlocked states based on torque applied by the drive actuator. Locking mechanism 150 includes a drive motor 151, a motor interface assembly 152, a lock interface assembly 155, and a load interface assembly 156. Drive motor 151 includes an output shaft 153 coupled to motor interface assembly 152, which is disposed adjacent to lock interface assembly 155, which is in turn disposed adjacent to load interface assembly 156, which is coupled to output shaft 157 coupled to a load (e.g., differential 103). Lock interface assembly 155 includes one or more locking pins which are engaged with holes in a reference structure to prevent the lock interface assembly from rotating when a threshold output torque level is reached. To release the lock interface assembly at a point in time when the output torque is below the threshold value, drive motor 151 applies a torque to a cam mechanism which pulls the pins away from the holes, releases the lock interface assembly, and initiates contact between the output shaft 153 and the lock interface assembly to transmit torque through the lock mechanism.

Figure 12:
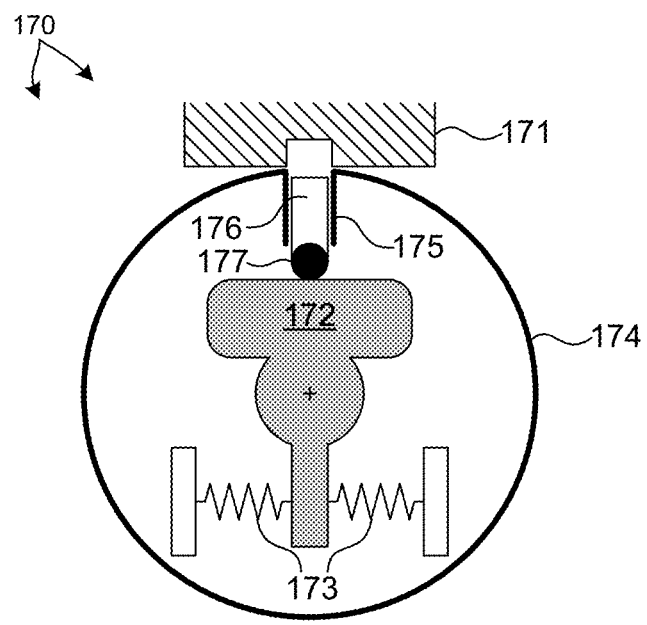
FIG. 12 is a diagram illustrative of an embodiment 170 of a locking mechanism as viewed from the load side in an unlocked configuration.
Figure 13:
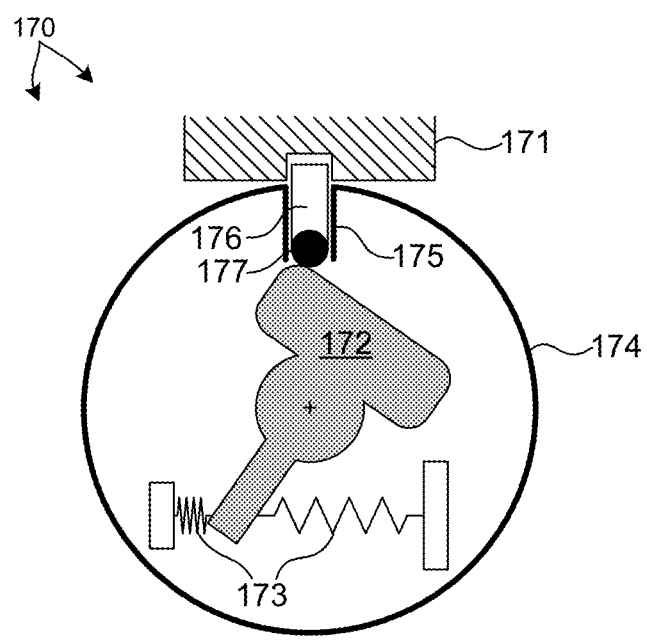
FIG. 13 is a diagram illustrative of an embodiment 170 of a locking mechanism as viewed from the load side in a locked configuration.

FIGS. 12 and 13 depict an embodiment 170 of a locking mechanism as viewed from the load side. As depicted in FIGS. 12 and 13, the load interface assembly includes an eccentric element 172 coupled to the load shaft (e.g., output shaft 152). The lock interface assembly includes a frame 174 and an engaging element 176 (e.g., a pin) coupled to a roller 177 in contact with eccentric element 172. In addition, eccentric element 172 is coupled to frame 174 by springs 173. Output torque is transmitted from frame 174 to eccentric element 172 via springs 173.

As depicted in FIG. 12, when the output torque level is small, the deflection of springs 173 is very small and there is little movement of eccentric element 172 relative to roller 177. In this configuration, pin 176 is disengaged from reference structure 171 and torque is freely transmitted through locking mechanism 170.

As depicted in FIG. 13, when the output torque level is large and exceeds a threshold value, the deflection of springs 173 is significant, which causes a rotation of eccentric element 172 relative to roller 177. This rotation of eccentric element 172 causes eccentric element 172 to push roller 177 and pin 176 outward and engages pin 176 with a void (e.g., hole) in reference structure 171. In this configuration, pin 176 is engaged with reference structure 171, frame 174 is locked to reference structure 171, and torque is not transmitted through locking mechanism 170.

Figure 14:
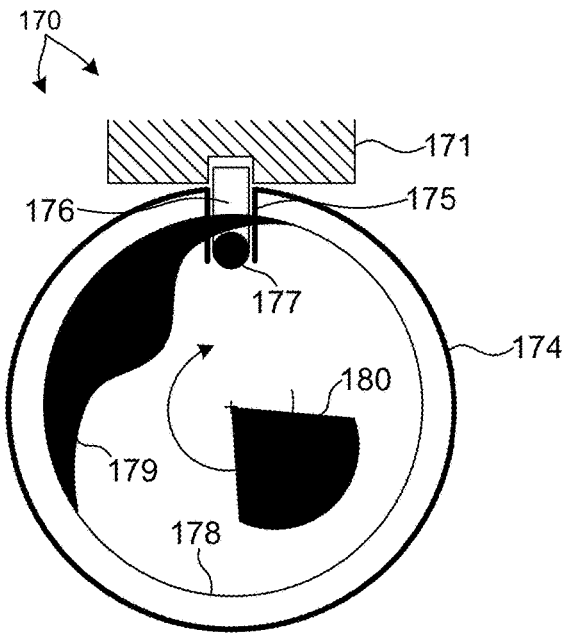
FIG. 14 is a diagram illustrative of embodiment 170 of a locking mechanism as viewed from the motor side in a locked configuration.
Figure 15:
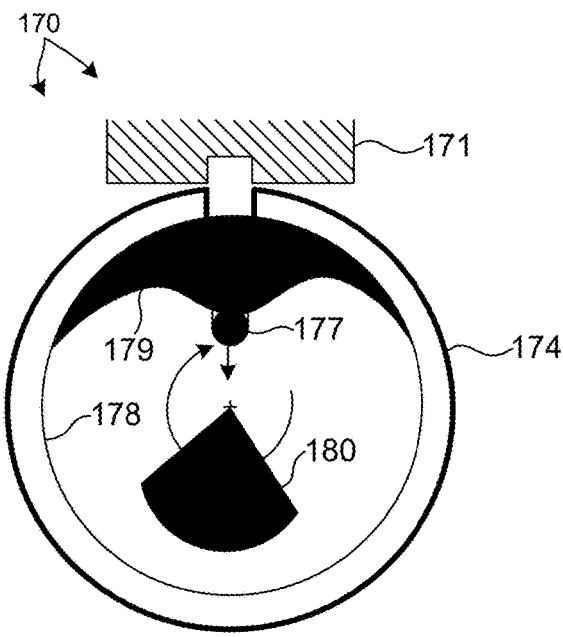
FIG. 15 is a diagram illustrative of embodiment 170 of a locking mechanism as viewed from the motor side in an unlocked configuration.
Figure 16:
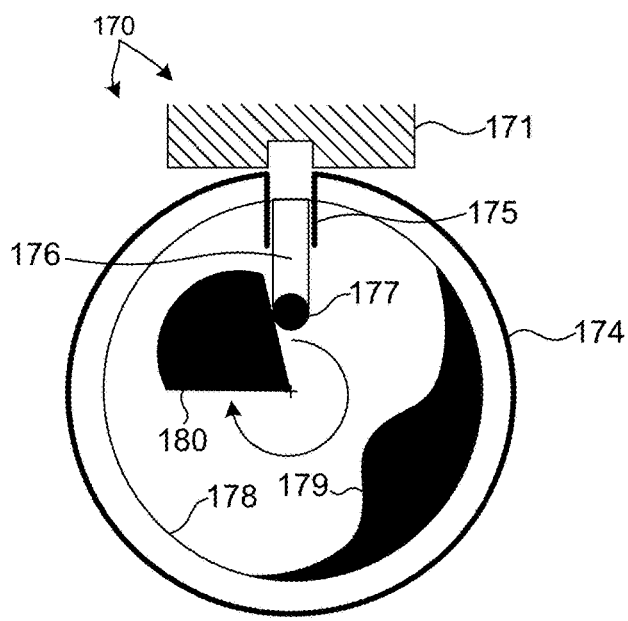
FIG. 16 is a diagram illustrative of embodiment 170 of a locking mechanism as viewed from the motor side in a configuration suitable to transmit torque.

FIGS. 14-16 depict embodiment 170 of a locking mechanism as viewed from the motor side. Like numbered elements are the same as those described with reference to FIGS. 12 and 13. As depicted in FIGS. 14-16, the motor interface assembly includes an eccentric element 179 and a wedge element 180 coupled to the end 178 of the motor shaft (e.g., motor shaft 153). Eccentric element 179 and wedge element 180 rotate with the drive motor. As depicted in FIG. 14, the drive motor rotates eccentric element 179 and wedge element 180 and eccentric element 179 engages with roller 177 and begins to pull roller 177 and pin 176 inward. Roller 177 extends through frame 174 to make contact with the motor shaft and load shaft as described herein. As depicted in FIG. 15, the rotation of the eccentric element 179 with respect to frame 174 causes disengagement of pin 176 from reference structure 171; releasing frame 174 from reference structure 171. As depicted in FIG. 16, the rotation of the wedge element 180 with respect to frame 174 causes wedge 180 to contact roller 177 and transmit torque from the drive motor through frame 174 to the output shaft as described with reference to FIGS. 12-13.

Figure 10:
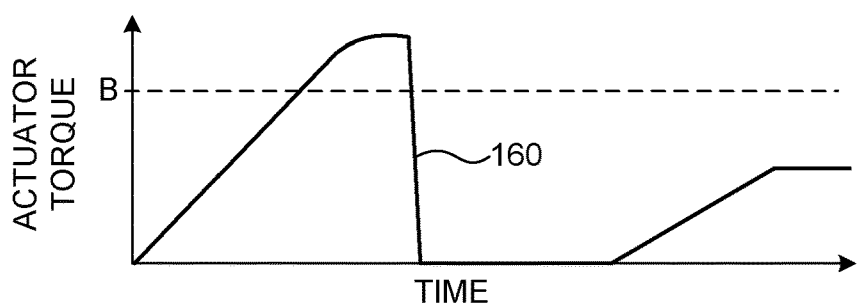
FIG. 10 depicts a plot 160 illustrating actuator torque as a function of time during disengagement and engagement of a locking mechanism with a reference structure.

FIG. 10 depicts a plot 160 illustrating actuator torque as a function of time during disengagement and engagement of locking mechanism 170 with reference structure 171. As depicted in FIG. 10, as actuator torque increases beyond a threshold value, B, springs 173 have deflected to the point that pin 176 is beginning to engage with reference structure 171. When pins 176 fully engage with reference structure 171, actuator torque drops to zero as frame 174 is locked to reference structure 171, releasing the drive motor from any load. After some time, a controller (e.g., computing system 115) communicates a control command that causes the drive motor to begin to rotate, engage eccentric 179 with roller 177, release pin 176 from reference structure 171, and engage wedge element 180 with roller 177, effectively coupling the output shaft of the drive motor with frame 174.

Figure 11:
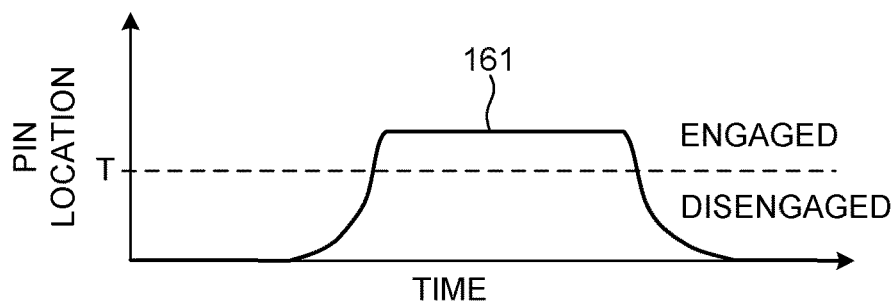
FIG. 11 depicts a plot 161 illustrating the position of an engaging element as a function of time during disengagement and engagement of a locking mechanism with a reference structure.

FIG. 11 depicts a plot 161 illustrating the position of pin 176 as a function of time during disengagement and engagement of locking mechanism 170 with reference structure 171. As depicted in FIG. 11, as actuator torque increases pin 176 moves past a threshold position, T, from a disengaged position to an engaged position. When pins 176 fully engage with reference structure 171, the pin position remains constant as frame 174 is locked to reference structure 171. After some time, a controller (e.g., computing system 115) communicates a control command that causes the drive motor to begin to release pin 176 from reference structure 171. Pin 176 moves past a threshold position, T, from an engaged position to a disengaged position; effectively coupling the output shaft of the drive motor with frame 174.

In general, the transition between locked and unlocked states based on torque applied by the drive actuator occurs at a fixed threshold value established by springs 173. In this example, the low torque, high speed transmission path is locked when the load torque exceeds a predetermined threshold value, B. This saves the low torque, high speed drive motor from overload, and diverts the load to the high torque, low speed drive motor, which is well suited to the task. Conversely, when load torque is below the threshold value and high speed is desired, the low torque, high speed transmission path is unlocked as described herein. This saves the high torque, low speed drive motor from operating above its recommended speed range and diverts the load to the low torque, high speed drive motor, which is well suited to the task.

MD-VTR systems as described herein may be integrated into a variety of robotic and manufacturing equipment.

Figure 17:
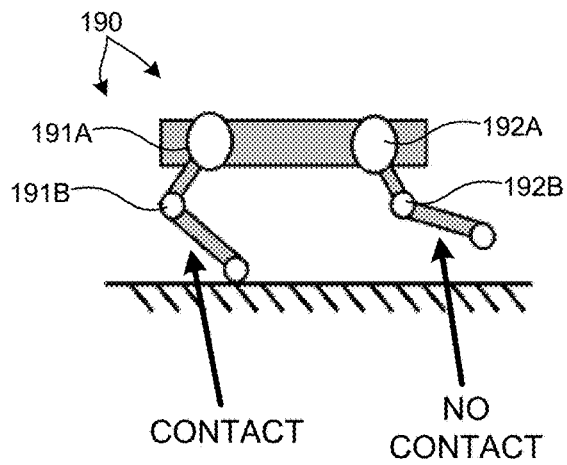
FIG. 17 is a diagram illustrative of a legged robot 190 employing an MD-VTR system as described herein.

FIG. 17 depicts an illustration of a legged robot 190 including legs that make periodic contact with a ground surface. As depicted in FIG. 17, rotary actuators 191A and 191B position a leg that is in contact with the ground and rotary actuators 192A and 192B position a leg that is not in contact with the ground. In this configuration, actuators 191A and 191B must generate high torque to support the body of the legged robot 190, while actuators 192A and 192B must generate high speed to quickly reposition the leg to the next contact with the ground. As the legged robot 190 moves across the ground, these requirements alternate between the two sets of rotary actuators. Thus, an MD-VTR system provides an advantage by enabling a smooth transition between high torque and high speed operating modes as the configuration of the legged robot 190 changes over time.

Figure 18:
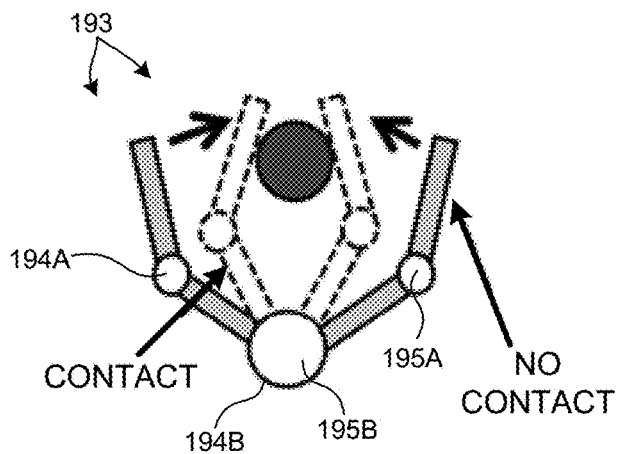
FIG. 18 is a diagram illustrative of a robotic gripper 193 employing an MD-VTR system as described herein.

FIG. 18 depicts an illustration of a robotic gripper 193 including fingers that grasp an object. As depicted in FIG. 18, rotary actuators 194A and 194B position a finger and rotary actuators 195A and 195B position another finger. While moving toward an object to grasp it, rotary actuators 194A and 194B and rotary actuators 195A and 195B must generate high speed to quickly grasp the object. After grasping the object, rotary actuators 194A and 194B and rotary actuators 195A and 195B must generate high torque to support the object grasped by the robotic gripper 193. As the robotic gripper 193 grasps and releases different object, these requirements alternate. Thus, an MD-VTR system provides an advantage by enabling a smooth transition between high torque and high speed operating modes as the configuration of the robotic gripper 193 changes over time.

Figure 19:
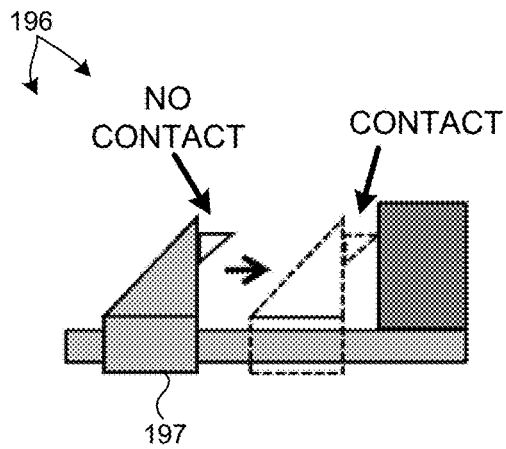
FIG. 19 is a diagram illustrative of a machine tool 196 employing an MD-VTR system as described herein.

FIG. 19 depicts an illustration of a machine tool 196 including a tool moved into contact with a part being machined. As depicted in FIG. 19, a rotary actuator 197 positions a tool with respect to a part via a lead screw. While moving toward the part, rotary actuator 197 must generate high speed to quickly engage the tool with the part. After engaging the tool with the part, rotary actuator 197 must generate large forces to maintain contact between the tool and the part while the machining process is undertaken. As the machine tool 196 machines many different objects, these requirements alternate. Thus, an MD-VTR system provides an advantage by enabling a smooth transition between high torque and high speed operating modes as the configuration of the machine tool 196 changes over time.

FIG. 20 illustrates a flowchart of a method 200 suitable for implementation by a MD-VTR system as described herein. In some embodiments, MD-VTR system 100 is operable in accordance with method 200 illustrated in FIG. 20. However, in general, the execution of method 200 is not limited to the embodiments of MD-VTR system 100 described with reference to FIG. 1. These illustrations and corresponding explanation are provided by way of example as many other embodiments and operational examples may be contemplated.

In block 201, a first drive actuator of a multiple drive variable transmission ratio system is selectively disengaged from a load. The load is coupled to a first input port of a differential transmission subsystem. The first drive actuator is disengaged from the load by locking the load to a reference structural element by moving a plurality of engaging elements of a locking mechanism to an engaged position that couples the load to the reference structural element.

In block 202, the first drive actuator of the multiple drive variable transmission ratio system is selectively engaged to the load by unlocking the load from the reference structural element by moving the plurality of engaging elements of the locking mechanism to a disengaged position that decouples the load from the reference structural element.

In the embodiment depicted in FIG. 2, computing system 115 is communicatively coupled to drive motors 101 and 102 and locking mechanism 110 by wired communication links. However, in general, computing system 115 may be communicatively coupled to any of the sensors and devices described herein by either a wired or wireless communication link.

As depicted in FIG. 1, computing system 115 includes at least one processor 117, a memory 116, and a bus 118. Processor 117 and memory 116 are configured to communicate over bus 140. Memory 116 includes an amount of memory 119 that stores program code that, when executed by processor 117, causes processor 117 to implement multiple drive, variable transmission ratio functionality as described herein.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A multiple drive variable transmission ratio system, comprising:
   a reference structural element;
   a differential subsystem including an output port coupled to a load, a first input port, and a second input port, wherein the load is moveable with respect to the reference structural element;
   a first drive actuator coupled to the first input port over a first mechanical transmission path;
   a second drive actuator selectively coupled to the second input port over a second mechanical transmission path; and
   a locking mechanism located in the second mechanical transmission path between the second drive actuator and the second input port, wherein the locking mechanism is configured to couple the second drive actuator to the second input port in a first state and couple the second input port to the reference structural element in a second state, the locking mechanism comprising:
      a plurality of engaging elements in contact with the reference structural element and movable with respect to the reference structural element;
      a plurality of receiving cavities fabricated into a frame, the frame located in the second mechanical transmission path after the second drive actuator and before the second input port of the differential; and
      a sliding frame element in contact with the plurality of engaging elements, the sliding frame element is movable with respect to the reference structural element, an engaging movement of the sliding frame element causes the plurality of engaging elements to move into contact with the plurality of receiving cavities at an index position of the frame with respect to the reference structural element, a disengaging movement of the sliding frame element causes the plurality of engaging elements to move out of contact with the plurality of receiving cavities.

2. The multiple drive variable transmission ratio system of claim 1, further comprising:
   a first speed reducer having a first speed reduction ratio located in the first mechanical transmission path.

3. The multiple drive variable transmission ratio system of claim 2, further comprising:
   a second speed reducer having a second speed reduction ratio located in the second mechanical transmission path, wherein the first speed reduction ratio is larger than the second speed reduction ratio.

4. The multiple drive variable transmission ratio system of claim 3, wherein any of the first and second speed reducers include a gear reduction mechanism, a belt and pulley mechanism, or a combination thereof.

5. The multiple drive variable transmission ratio system of claim 1, wherein the first and second drive actuators are any of an electric motor, a hydraulic motor, and a pneumatic motor.

6. The multiple drive variable transmission ratio system of claim 1, wherein the plurality of engaging elements are aligned with the plurality of receiving cavities at the index position.

7. The multiple drive variable transmission ratio system of claim 1, wherein each of the plurality of receiving cavities are arranged equidistant from an axis of rotation of a shaft coupled to the second input port of the differential and equidistant from an adjacent receiving cavity of the plurality of receiving cavities.

8. The multiple drive variable transmission ratio system of claim 1, wherein the plurality of engaging elements move in a direction parallel to an axis of rotation of a shaft coupled to the second input port of the differential.

9. The multiple drive variable transmission ratio system of claim 1, wherein the plurality of engaging elements move in a direction perpendicular to an axis of rotation of a shaft coupled to the second input port of the differential.

10. The multiple drive variable transmission ratio system of claim 1, wherein each of the plurality of engaging elements are spherical elements or cylindrical elements.

11. The multiple drive variable transmission ratio system of claim 1, further comprising:
    an actuator that receives a command from computing system and moves the sliding frame element with respect to the reference structural element in response to the command signal.

12. A multiple drive variable transmission ratio system, comprising:
    a reference structural element;
    a differential subsystem including an output port coupled to a load, a first input port, and a second input port, wherein the load is moveable with respect to the reference structural element;
    a first drive actuator coupled to the first input port with a first speed reducer having a first transmission ratio;
    a second drive actuator selectively coupled to the second input port with a second speed reducer having a second transmission ratio; and
    a locking mechanism coupled to the second drive actuator and the second input port, wherein the locking mechanism is configured to couple the second drive actuator to the second input port in a first state and couple the second input port to the reference structural element in a second state, the locking mechanism comprising:
       a plurality of engaging elements in contact with the reference structural element and movable with respect to the reference structural element a plurality of receiving cavities fabricated into a portion of a structural element that couples the locking mechanism to the second input port of the differential; and a sliding frame element in contact with the plurality of engaging elements, the sliding frame element is movable with respect to the reference structural element, an engaging movement of the sliding frame element causes the plurality of engaging elements to move into contact with the plurality of receiving cavities at a first position of the sliding frame element with respect to the reference structural element and at an index position of the structural element with respect to the reference frame element, a disengaging movement of the sliding frame element causes the plurality of engaging elements to move out of contact with the plurality of receiving cavities at a second position of the sliding frame element with respect to the reference structural element.

13. The multiple drive variable transmission ratio system of claim 12, wherein the first and second drive actuators are any of an electric motor, a hydraulic motor, and a pneumatic motor.

14. The multiple drive variable transmission ratio system of claim 12, wherein the plurality of engaging elements are aligned with the plurality of receiving cavities at the index position.

* * * * *